(12) United States Patent
Takaoka et al.

(10) Patent No.: US 9,572,298 B2
(45) Date of Patent: Feb. 21, 2017

(54) RIDING MOWER WITH IMPROVED OPERATION VISIBILITY

(71) Applicant: KUBOTA CORPORATION, Osaka (JP)

(72) Inventors: Masaki Takaoka, Osaka (JP); Masato Asahara, Hyogo (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 14/840,642

(22) Filed: Aug. 31, 2015

(65) Prior Publication Data
US 2016/0193970 A1 Jul. 7, 2016

(30) Foreign Application Priority Data

Jan. 5, 2015 (JP) .................. 2015-000358

(51) Int. Cl.
| | |
|---|---|
| A01D 34/64 | (2006.01) |
| A01D 34/82 | (2006.01) |
| B60K 37/02 | (2006.01) |
| B60K 35/00 | (2006.01) |
| B60K 37/06 | (2006.01) |

(52) U.S. Cl.
CPC ............ *A01D 34/64* (2013.01); *A01D 34/82* (2013.01); *B60K 35/00* (2013.01); *B60K 37/02* (2013.01); *B60K 37/06* (2013.01); *B60K 2350/1048* (2013.01)

(58) Field of Classification Search
CPC ........ A01D 34/64; A01D 34/66; A01D 34/82; A01D 2101/00; B60K 37/02
See application file for complete search history.

(56) References Cited

U.S. PATENT DOCUMENTS

| | | | | |
|---|---|---|---|---|
| 8,777,263 B2* | 7/2014 | Biers, Sr. | ............... | B60J 11/00 135/88.01 |
| 8,888,133 B2* | 11/2014 | Tsuchihashi | ............. | B62D 1/16 280/779 |
| 2013/0030667 A1* | 1/2013 | Fujimoto | ............. | B60W 10/06 701/93 |
| 2014/0150390 A1* | 6/2014 | Schygge | ............... | A01D 69/02 56/10.2 A |
| 2014/0246468 A1* | 9/2014 | Montgomery | ...... | B60R 11/0229 224/548 |
| 2014/0266664 A1* | 9/2014 | Dwyer | .................. | B60K 35/00 340/459 |
| 2015/0359168 A1* | 12/2015 | Higashikawa | ....... | A01D 34/001 56/14.7 |
| 2016/0014956 A1* | 1/2016 | Matsumoto | ............ | A01D 34/64 56/10.7 |

FOREIGN PATENT DOCUMENTS

JP 2013-252073 12/2013

\* cited by examiner

*Primary Examiner* — Drew Brown
(74) *Attorney, Agent, or Firm* — Greenblum & Bernstein, P.L.C.

(57) ABSTRACT

A mower includes: a left panel positioned on a left side of a driver's seat. The driver's seat is positioned rearward of a mower unit. A display unit is arranged in an area of the left panel. A line linking a left front corner area of the mower unit and a top center portion of a seat back of the driver's seat passes through the display unit. The display unit is arranged so that a screen of the display unit faces the top center portion of the seat back.

15 Claims, 9 Drawing Sheets

RIDING MOWER WITH IMPROVED OPERATION VISIBILITY

CROSS-REFERENCE TO RELATED APPLICATIONS

The present application claims priority under 35 U.S.C. §119 of Japanese Application No. 2015-000358, filed on Jan. 5, 2015, the disclosure of which is expressly incorporated by reference herein in its entirety.

BACKGROUND OF THE INVENTION

1. Field of the Invention

The present invention relates to a mower having a mower unit mounted on a vehicle frame, the vehicle frame being supported by front wheels and rear wheels. A display unit is arranged on the mower at a location that allows a driver to read the display unit when or while also seeing the left front corner of the mower unit.

2. Description of Related Art

In a mower according to Japanese Patent Laid-open Publication No. 2013-252073, in order to ensure as much as possible that a driver sitting in a driver's seat has both a field of vision of a flat panel display displaying various information and a field of vision of a periphery of a mower unit, the flat panel display is provided to a steering post below the steering wheel in a vicinity of a rotation axis center of the steering wheel, and at least one opening defined by spokes and a ring of the steering wheel is larger than the flat panel display as viewed from a direction of the rotation axis center of the steering wheel. According to this configuration, information displayed on the flat panel display may be visually confirmed through the opening on an inner side of the steering wheel.

However, it is necessary for the driver of the mower to operate the mower so as to align an end portion of a mowing width of the mower unit with the borderline between mowed and unmowed areas, while also paying attention to various notification information notified by, for example, a tachometer, a speedometer, a water temperature indicator, a battery indication light and the like, similar to operating an automobile. For this reason, when carrying out precise mowing work or the like, it is necessary for the driver to shift his/her line of vision from a straight forward direction to an obliquely lateral direction to carefully watch the end portion of the mowing width positioned at an outer end area of the mower in a lateral direction of the mower, while occasionally shifting his/her line of vision back to the center (in the straight forward direction) to carefully watch a display screen and confirm the information displayed thereon.

In view of the above, there is a need for a driver to be able to confirm the borderline between mowed and unmowed areas and confirm operation information of a mower without frequently shifting his/her line of vision between a straight forward direction and an obliquely lateral direction.

SUMMARY OF THE INVENTION

A mower according to the present invention having a mower unit mounted on a vehicle frame which is supported by front and rear wheels includes: a driver's seat provided to the vehicle frame in a position rearward of the mower unit; a left panel positioned on a left side of the driver's seat; and a display unit arranged in an area of the left panel where a line linking a left front corner area of the mower unit and a top center portion of a seat back of the driver's seat passes through, the display unit being arranged so that a screen of the display unit faces the top center portion of the seat back.

Basically, during mowing work, the mower is operated so that the borderline between mowed and unmowed areas is on a left side of a vehicle in a forward direction, and a driver carefully watches the left front corner area of the mower unit in which the borderline between the mowed and unmowed areas and an end portion of a mowing width of the mower unit is formed. According to a configuration of the present invention, since the display unit is arranged in the area of the left panel where the line linking the left front corner area of the mower unit and the seat back top center portion of the driver's seat passes through, the screen of the display unit is positioned in a line of vision of the driver sitting in the driver's seat whose line of vision is directed at the left front corner area of the mower unit. Therefore, the driver is able to confirm, without shifting his/her line of vision, the degree of overlap of the end portion of the mowing width with the borderline between the mowed and unmowed areas as well as the traveling information of the mower displayed on the screen of the display unit.

In a preferred embodiment of the present invention, a left fender has a fender top surface inclining downward in a forward direction, and the left panel is provided along the fender top surface. The left panel includes an attachment base which protrudes upward, the attachment base having an inclined attachment surface to mount the display unit. With this configuration, since the fender top surface of the left fender inclines downward in the forward direction, the left fender is less likely to obstruct the field of vision of the driver directed at the left front corner of the mower unit. However, since the attachment base on which the display unit is mounted protrudes upward from the fender top surface, the display unit itself is within the driver's field of vision directed at the left front corner area of the mower unit; thus, the display unit screen can be sufficiently confirmed by the driver.

When a front side portion of the left fender is high, the left fender obstructs the driver's field of vision directed at the left front corner area of the mower unit. In order to resolve this problem, in a preferred embodiment of the present invention, the top surface of the fender is formed as a curved surface extending in a front-back direction of the vehicle and configured by a first top surface positioned forward of the display unit and a second top surface positioned rearward of the display unit, a curvature of the first top surface being greater than a curvature of the second top surface.

With respect to operation systems of mowers, there is a steering wheel operation method, and a lever operation method which involves a left-right pair of operating levers. In a case where the latter method is employed, a left hand-operated speed change lever is arranged forward of the driver's seat on the left side and a right hand-operated speed change lever is arranged forward of the driver's seat on a right side. In a preferred embodiment of the present invention in such a case, an opening is formed in an area near the center of the vehicle and forward of the attachment base of the left panel to allow the left hand-operated speed change lever to pass upwardly through the opening. The left hand-operated speed change lever curves toward the center of the vehicle above the opening. An advantage of this configuration is that the opening for the left hand-operated speed change lever and a display unit mounting portion can be created using a single left panel.

Since there are various types of information that should be notified to the driver during operation of the mower such as rotational speed of the engine, traveling speed, cooling water temperature, remaining battery capacity, remaining fuel amount and the like, it is not only difficult to display all of such information on a limited area of the display screen of the display unit, but notification via a notification device, such as a separately configured warning lamp, may be more suitable. For this reason, in a preferred embodiment of the present invention, a notification device group is arranged around the screen of the display unit, the screen of the display unit and the notification device group forming a notification unit.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
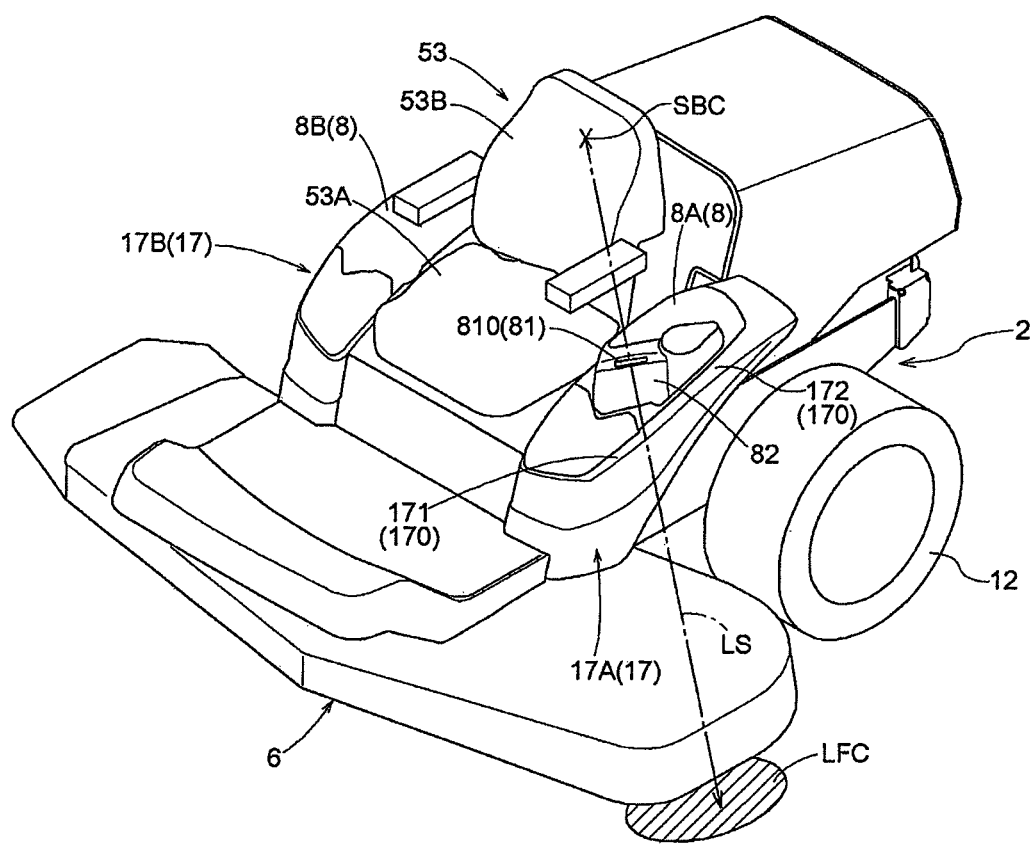
FIG. 1 is a schematic diagram illustrating an arrangement of a display unit on a schematically shown mower.

Before describing a specific embodiment of a mower according to the present invention, an arrangement of a display unit 81 which displays various information for operation is described with reference to FIG. 1 as one aspect to the present invention. The mower shown in FIG. 1 is rendered schematically, illustrating only a vehicle frame 2 extending in a front-back direction of the vehicle, a driver's seat 53 configured by a seat cushion 53A and a seat back 53B, a mower unit 6, rear wheels 12, fenders 17 configured by a left fender 17A and a right fender 17B and the like. As a rule, in the present description, a front-back direction refers to a longitudinal direction (travel direction) of the mower; a lateral direction (left-right direction) refers to a width direction of the mower (i.e., a direction orthogonal to the front-back direction); and a vertical direction refers to a direction perpendicular to the ground (horizontal plane).

A left front corner area LFC of the mower unit 6 is an area in which a borderline between mowed and unmowed areas appears. A driver operates the mower so that a left side end portion of a mowing width of the mower unit 6 slightly overlaps with the borderline.

A left panel 8 is mounted to a top surface 170 of the left fender 17A. A display unit 81 configured by liquid crystal and the like is arranged on the left panel 8 so that a screen 810 faces a seat back top center portion SBC, the seat back top center portion SBC being a center area of a top portion of the seat back 53B. The seat back top center portion SBC is an area which faces a region higher than the shoulders of the seated driver. According to this arrangement configuration, the screen 810 of the display unit 81 faces the face of the driver sitting in the driver's seat 53. In addition, a position of the display unit 81 is determined such that a line LS linking the left front corner area LFC of the mower unit 6 and the seat back top center portion SBC passes through the screen 810. This ensures that the screen 810 is within the field of vision of the driver who is sitting in the driver's seat 53 and carefully watching the left front corner area LFC. With such an arrangement configuration of the display unit 81, the driver is able to confirm the borderline between the mowed and unmowed areas and the operation information of the traveling mower with a line of vision in the same direction.

A left panel 8A is provided to the top surface 170 of the left fender 17A, the top surface 170 inclining downward in a forward direction. Additionally, an attachment base 82 projecting upward is formed on the left panel 8A. An inclined attachment surface to mount the display unit 81 at an appropriate posture is formed on the attachment base 82.

The fender top surface 170 is formed as a curved surface extending in a front-back direction of the vehicle, configured by a first top surface 171 positioned forward of the display unit 81 and a second top surface 172 positioned rearward of the display unit 81. The curvature of the first top surface 171 is greater than the curvature of the second top surface 172 so that the fender top surface 170 drops sharply downward in front of the display unit 81; thereby reducing obstruction of the field of vision of the driver directed at the left front corner area LFC.

Figure 2:
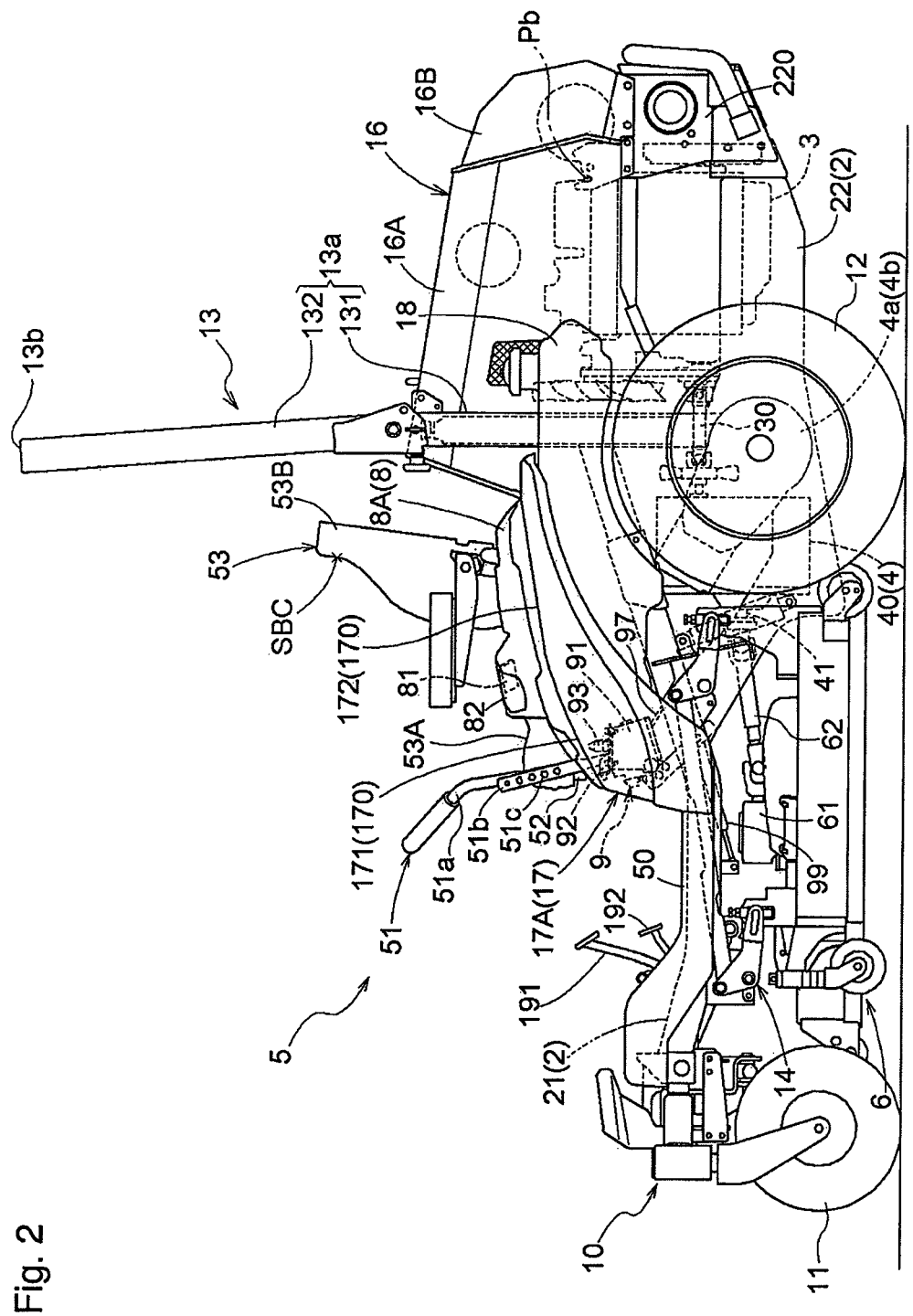
FIG. 2 is a side view of a zero-turn mower according to an embodiment of the present invention.
Figure 3:
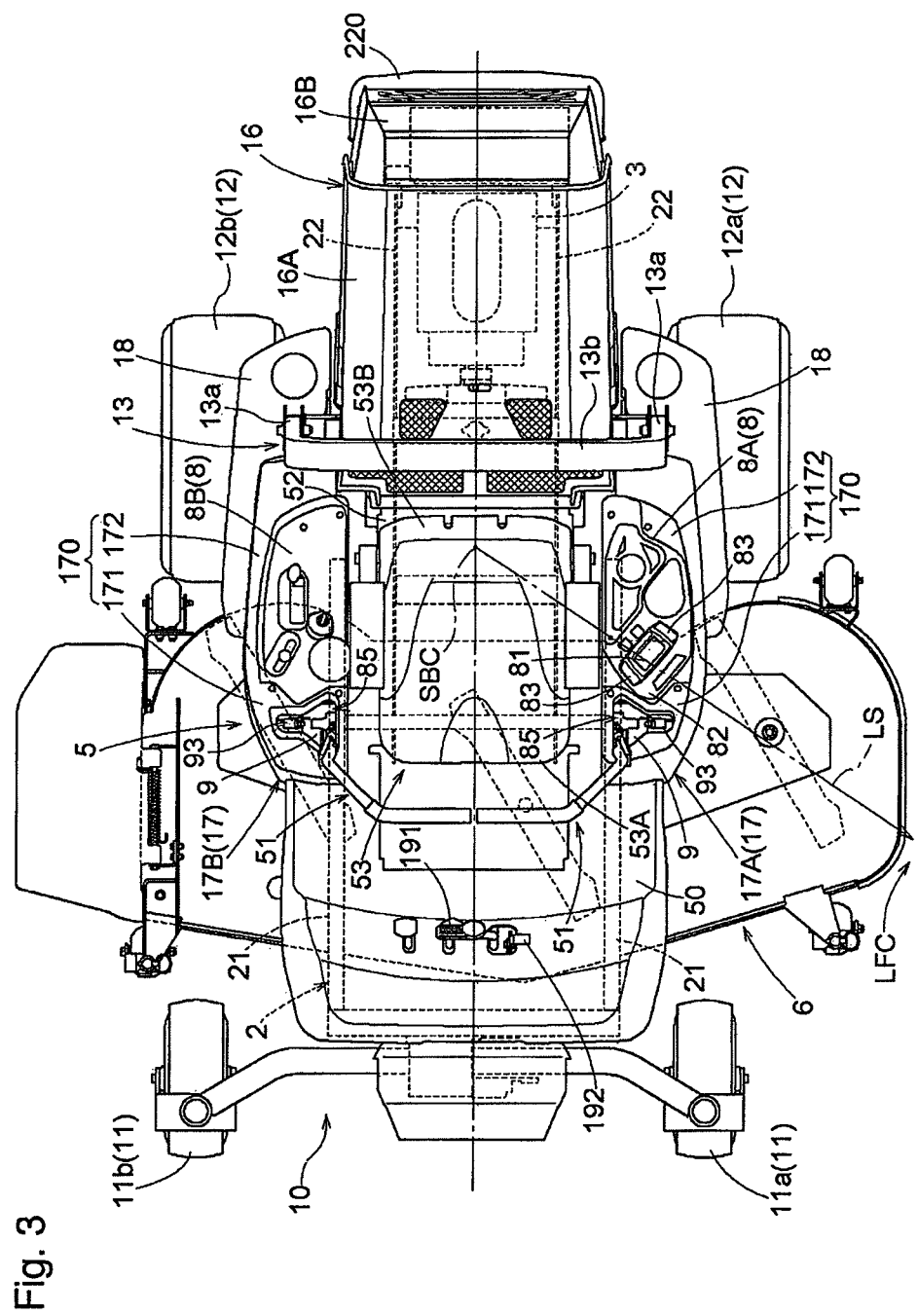
FIG. 3 is a top or plan view of the zero-turn mower.

Next, a specific embodiment of a riding mower according to the present invention is described with reference to the drawings. In this embodiment, the configuration and arrangement as described with reference to FIG. 1 are used. FIGS. 2 and 3 show side and plan views of a mower known as a zero-turn mower, which is one example of a mower. As illustrated in FIGS. 2 and 3, the mower is provided with a traveling vehicle body 10 supported on the ground by a front wheel unit having a left-right pair of front wheels 11 and a rear wheel unit having a left-right pair of rear wheels 12, the rear wheels 12 being rotationally driven. The traveling vehicle body 10 includes a vehicle frame 2 as a base member and the mower unit 6 is suspended from the vehicle frame 2 between the front wheel unit and the rear wheel unit via a link mechanism 14. An operation portion 5 is arranged in a center area in the front-back direction of the vehicle of the traveling vehicle body 10. Thus, in the operation portion 5, a seat support 52 is fixated on top of the vehicle frame 2 and the driver's seat 53 is located on or above a top surface of the seat support 52. The driver's seat 53 is configured by the seat cushion 53A, which holds or supports the driver's buttocks; and the seat back 53B, which holds or supports the back of the driver. Further, the fenders 17 are formed on left and right side surfaces of the seat support 52. A step 50 is laid or located forward of the driver's seat 53.

A ROPS apparatus 13 is provided to a rear portion of the operation portion 5. An engine 3 is arranged at a rear end area of the traveling vehicle body 10 and a transmission 4 is arranged forward of and slightly lower than the engine 3. The transmission 4 includes a left rear-axle transmission portion 4a and a right rear-axle transmission portion 4b. In FIG. 3 only the left rear-axle transmission portion 4a is illustrated by a dotted line; however, the right rear-axle transmission portion 4b is arranged on a right side of the vehicle at a position axisymmetrical with respect to the left rear-axle transmission portion 4a. Each of the left rear-axle transmission portion 4a and the right rear-axle transmission portion 4b has a built-in hydrostatic transmission (HST, an example of a continuously variable transmission), which may be operated independently. The HST can continuously change the speed from low speed to high speed while the engine is in a state of normal rotation. This includes forward or reverse rotation (backward) and allows for transmitting drive power from the engine to each of the left and right rear wheels 12 configuring the rear wheel unit. As a result, both the left and right rear wheels 12 can be driven in a forward direction at the same or substantially the same speed to enable forward travel in a straight line, and both the left and right rear wheels 12 can be driven in a backward direction at the same or substantially the same speed to enable backward travel in a straight line. Further, by making the speeds of the left and right rear wheels 12 different from each other, the traveling vehicle body 10 can be made to turn in an arbitrary direction. For example, the traveling vehicle body 10 can be made to make a small turn by operating one of the left and right rear wheels 12 at a low speed near zero and operating the other of the left and right rear wheels 12 at a high speed in a forward/backward direction. In addition, by driving the left and right rear wheels 12 in mutually opposite directions, the traveling vehicle body 10 can be made to perform a spinning turn about a turning center that is substantially the center portion between the left and right rear wheels 12. The front wheel unit is configured by a left-right pair of caster wheels 11 and can change direction freely about a vertical axis center; thus, the direction of the front wheel unit is corrected in accordance with the traveling direction as determined by the drive of each of the rear wheels 12 on the left and right sides of the rear wheel unit.

A speed change operation on the transmission 4, in particular a speed change operation on the left rear-axle transmission portion 4a and the right rear-axle transmission portion 4b, is performed by a left-right pair of speed change levers 51 arranged on both sides of the driver's seat 53. When the speed change levers 51 are held at a neutral position in the front-back direction, a swash plate of the HST (a continuously variable transmission) which is built into each of the left rear-axle transmission portion 4a and the right rear-axle transmission portion 4b is in a neutral stop position. Operating the speed change levers 51 forward from the neutral position causes the swash plate of the HST to rotate to a forward position, thereby actuating a forward speed change. Operating the speed change levers 51 rearward from the neutral position causes the swash plate of the HST to rotate to a backward position, thereby actuating a backward speed change.

As illustrated in FIG. 3, the vehicle frame 2 of the traveling vehicle body 10 is configured by a front frame 21 having a broad width and a rear frame 22 having a narrow width. The front frame 21 and the rear frame 22 are configured by a left-right pair of vertical beams extending in the front-back direction of the vehicle and a crossbeam linking the vertical beams. The width of the front frame 21 (space between the left and right vertical beams) is greater than the width of the rear frame 22, and a front portion of the rear frame 22 fits inside a rear portion of the front frame 21 as seen in a plan view. The front portion of the rear frame 22 is coupled to the rear portion of the front frame 21 by a coupling member (not shown in the drawings).

The engine 3 is installed in the middle of the rear frame 22 and is isolated from vibration. An input shaft 30 (see FIG. 2) extends substantially horizontally, coaxially with an extended portion of a crank shaft protruding forward from a lower portion of a front wall of the engine 3. The input shaft 30 transmits drive power from the engine to the transmission 4. In order to permit the greatest possible lifting of the front wheels 11, the height of the rear portion of the traveling vehicle body 10 above the ground must be raised. Therefore, the engine 3 is arranged in a higher position off the ground than the transmission 4. A PTO shaft 41, which transmits drive power to the mower unit 6, projects forward from a front wall of the transmission case 40 of the transmission 4. The height of the transmission 4 above the ground is low so as not to increase an angle of inclination of a PTO intermediate shaft 62, which connects the PTO shaft 41 and the PTO input 61 of the mower unit 6.

As illustrated in FIG. 2, a hood 16 defining an engine compartment is configured by a fixed hood 16B and a movable hood 16A, the fixed hood 16B being the rear hood fixated to a rear end frame 220 and the movable hood 16A being the front hood opening and closing around an open-close axis center Pb, which extends horizontally in a transverse direction of the vehicle.

As illustrated in FIGS. 2 and 3, the ROPS apparatus 13 includes a left-right pair of supporting columns 13a and a horizontal member 13b connecting top ends of the supporting columns 13a. The supporting columns 13a can pivot to bend in the middle. A leg 131, which is the lower half of the supporting column 13a, curves inward at substantially the same height position as the top end of the rear frame 22, and extends until reaching the rear end of the front frame 21. The rear end of the front frame 21 and the leg 131 of the ROPS apparatus 13 are coupled via a coupling bracket. A straight-line support column 132, which is the upper half of the support column 13a, is coupled to the leg 131 via a pivoting coupler so as to be capable of pivoting between a vertical posture and a sideways (or downward) posture.

The step 50 is mounted to the front frame 21 in a foot area of the driver's seat 53. The fenders 17 are provided on the left and right of the driver's seat 53, and fuel tanks 18 are provided below each of the fenders 17. A brake pedal 191 is arranged close to the center of a front area of the step 50. A brake lock pedal 192 for parking, which holds the brake pedal 191 in a depressed position, is provided beside the brake pedal 191. The fenders 17 are curved so as to decline forward as viewed from the side, and the left panel 8A and the left-side speed change lever 51 are arranged on the fender top surface 170 of the left fender 17A, the fender top surface 170 inclining downward in a forward direction.

Figure 4:
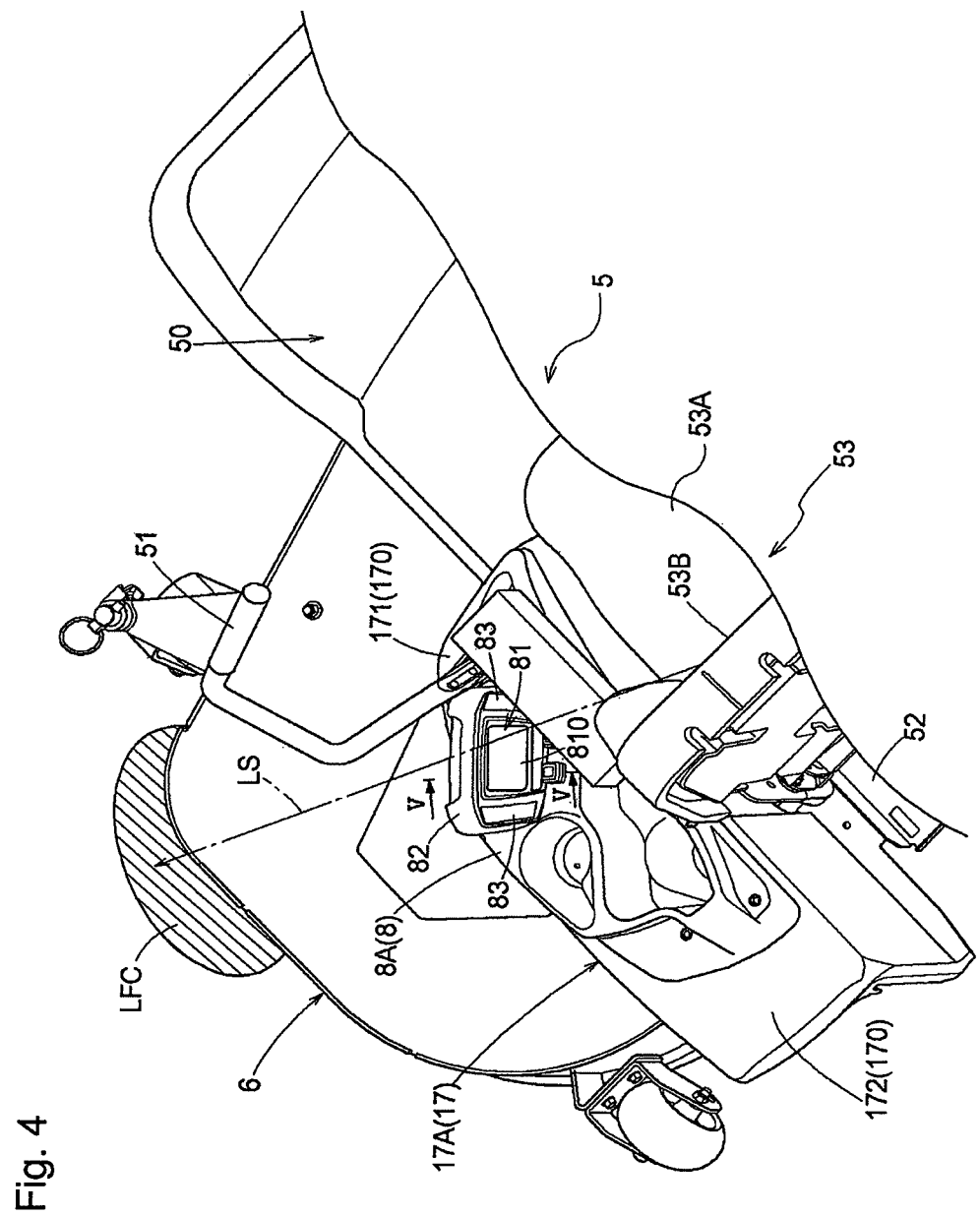
FIG. 4 is a perspective view illustrating a left side area of a driver's seat.

FIG. 4 illustrates a left side area of the driver's seat 53. The left front corner area LFC as described above is illustrated on the front left of the left side portion of the mower unit 6. The line LS linking the seat back top center portion SBC and the left front corner area LFC substantially passes through the screen 810 of the display unit 81. The fender top surface 170 is formed as a curved surface extending in the front-back direction of the vehicle, configured by the first top surface 171 positioned forward of the display unit 81 and the second top surface 172 positioned rearward of the display unit 81, the curvature of the first top surface 171 being greater than the curvature of the second top surface 172. In the present embodiment, the first top surface 171 extends forward so as to increase an angle of inclination of the forwardly declining first top surface 171 (see FIG. 2). Thus, the left fender 17A does not obstruct the field of vision of the driver when he/she carefully watches the left front corner area LFC.

Figure 5:
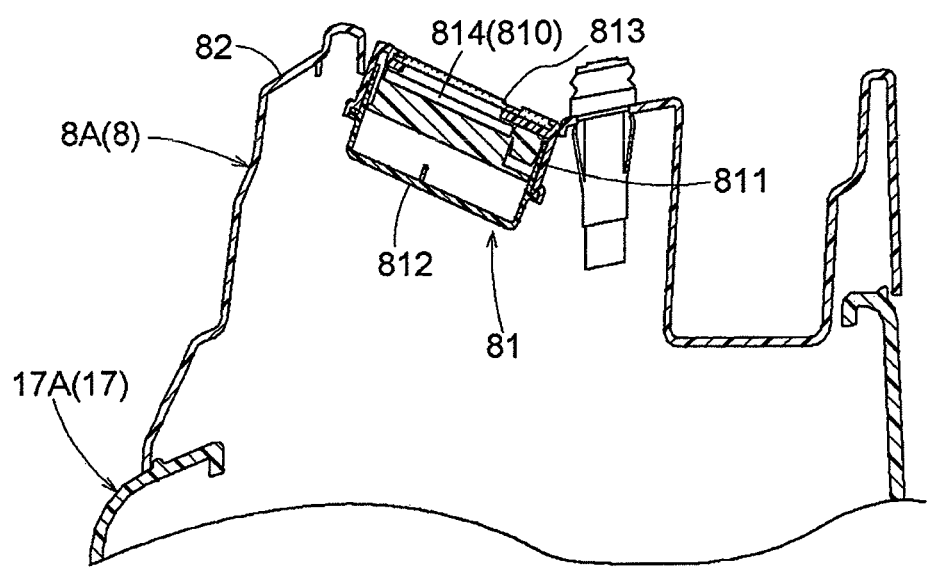
FIG. 5 is a cross-sectional view of the display unit and an attachment base as viewed from arrows V indicated in FIG. 4.

The attachment base 82 for attaching the display unit 81 is arranged so as to protrude upward from the top surface of the left panel 8A. FIG. 5 illustrates a cross-sectional view of the display unit 81 and the attachment base 82 as viewed from arrows V indicated in FIG. 4. The attachment base 82 is mounted to the top surface of the left panel 8A via a separate member. An attachment opening, which forms the inclined attachment surface, is provided to the attachment base 82. The attachment base 82 is shaped so as to rise from the top surface of the left panel 8A so that the display unit 81, which is mounted into the attachment opening, is in a posture that allows for easy viewing by the driver.

Figure 6:
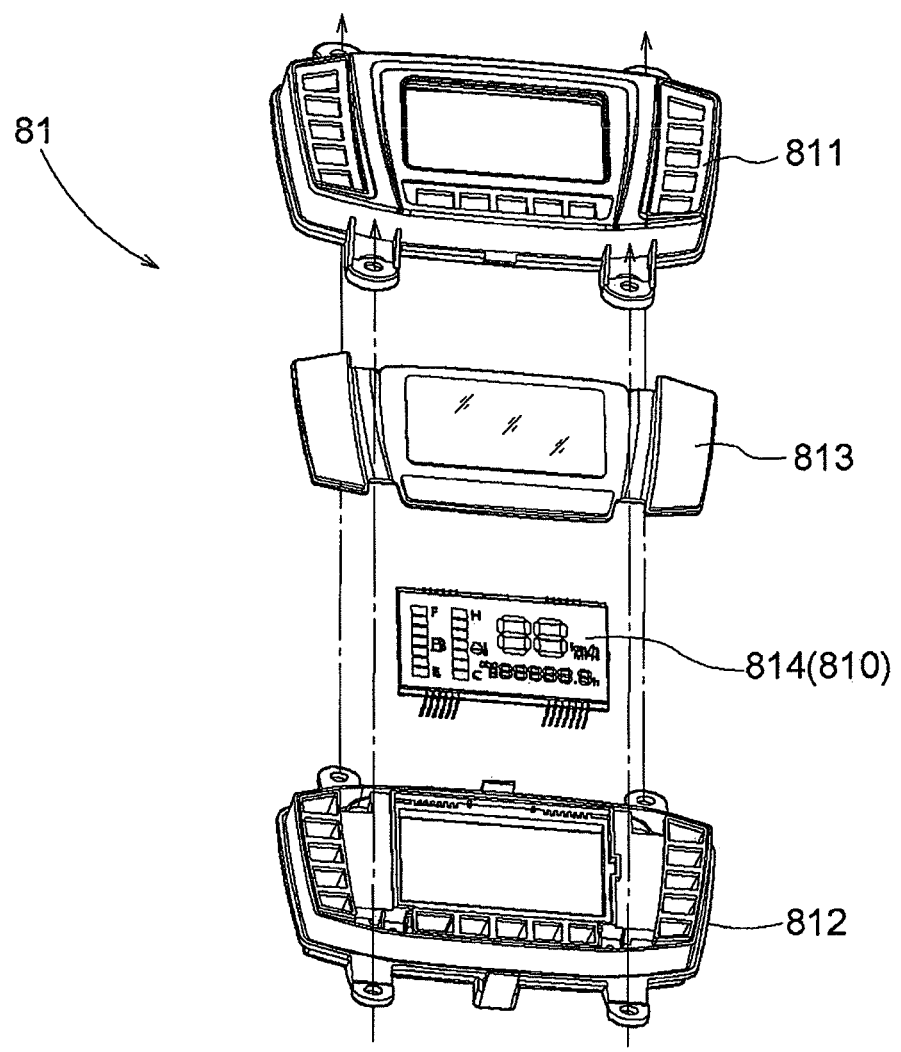
FIG. 6 is an exploded perspective view of the display unit.

As illustrated in FIG. 6, the display unit 81 is configured by a top cover body 811, a bottom cover body 812, a display frame 813, and a liquid crystal panel 814. The display frame 813 is sandwiched between the top cover body 811 and the bottom cover body 812. The top cover body 811 and the bottom cover body 812 are jointly fastened to the attachment base 82 via fastening bolts, which are inserted into four through holes mutually having the same axis center. The liquid crystal panel 814 is a member which acts as the screen 810 of the display unit 81. An opening covered by protective glass is formed on the display frame 813 and the liquid crystal panel 814 is mounted into the opening from under the opening. In the example illustrated in FIG. 6, the liquid crystal panel 814 displays the vehicle speed, rotational speed if the engine, operating time, cooling water temperature, remaining fuel amount and the like.

As illustrated in FIG. 4, a notification lamp group 83 which acts as a notification device group is arranged on both sides of the screen 810 of the display unit 81. As is clear from FIG. 6, the individual notification lamps configuring the notification lamp group 83 are inserted into holes formed on the top cover body 811 and the bottom cover body 812. A transparent plate is fitted in each of the holes of the top cover body 811. Illustrations and text indicative of content to be notified by the notification lamps, such as for example, hydraulic pressure drop, fuel exhaustion, and engine abnormality, are drawn on the transparent plates. Thus, the driver is able to confirm the traveling information of the mower through the screen 810, which includes the notification lamp group 83 of the display unit 81, while watching the degree of overlap of the end portion of the mowing width with the borderline between the mowed and unmowed areas.

As illustrated in FIG. 3, an opening 85 is formed in an area near the center of the vehicle and forward of the attachment base 82 of the left panel 8A to allow the left hand-operated speed change lever 51 to pass upwardly through the opening 85. The left hand-operated speed change lever 51 curves toward the center of the vehicle above the opening 85. Similarly, the opening 85 is also formed on a right panel 8B to allow the right hand-operated speed change lever 51 to pass upwardly through the opening 85. The right hand-operated speed change lever 51 is also curved toward the center of the vehicle above the opening 85, and a front end surface of the left hand-operated speed change lever 51 and a front end surface of the right hand-operated speed change lever 51 face each other.

Figure 7:
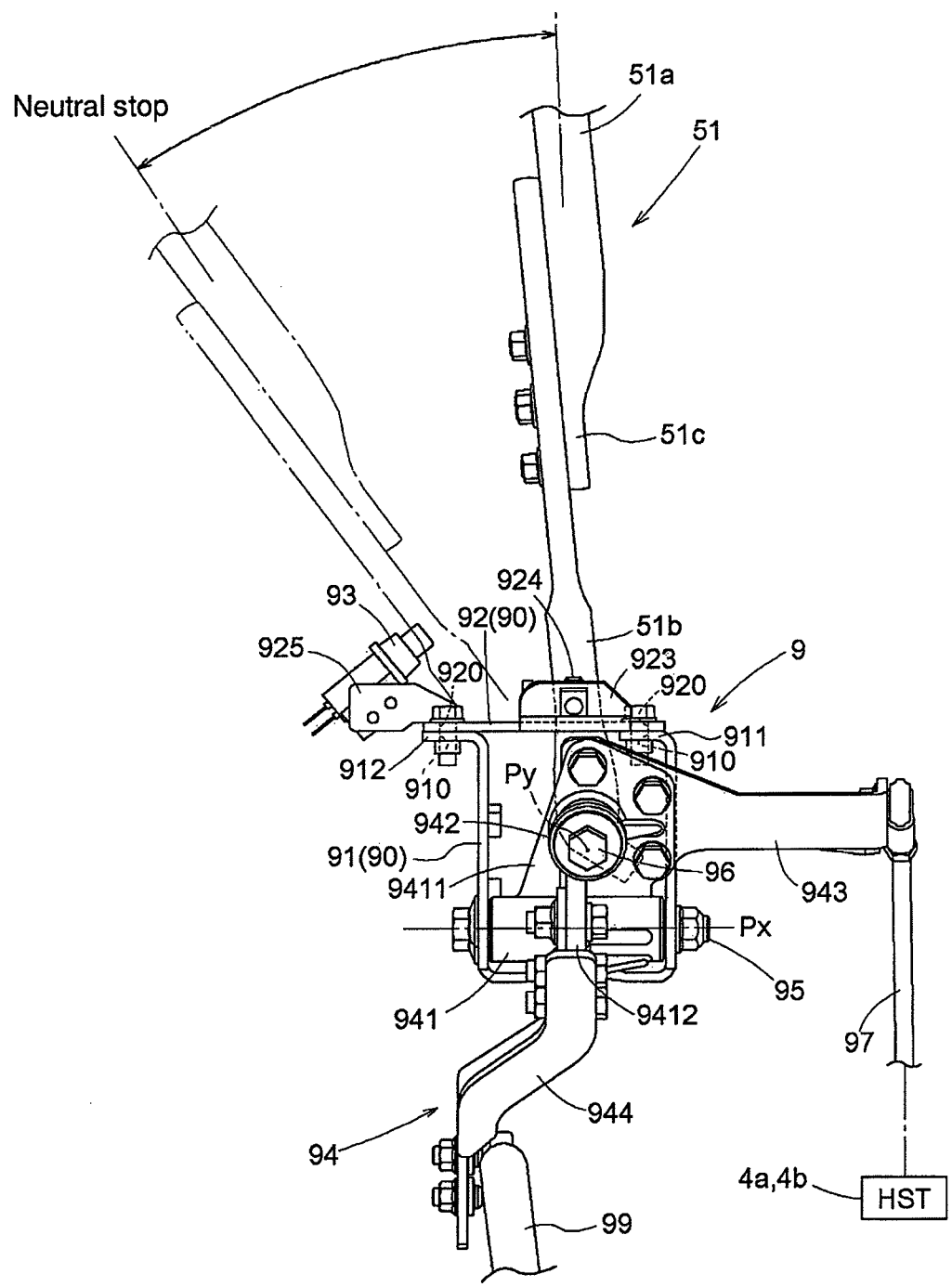
FIG. 7 is a back view illustrating an operation mechanism of a speed change lever.
Figure 8:
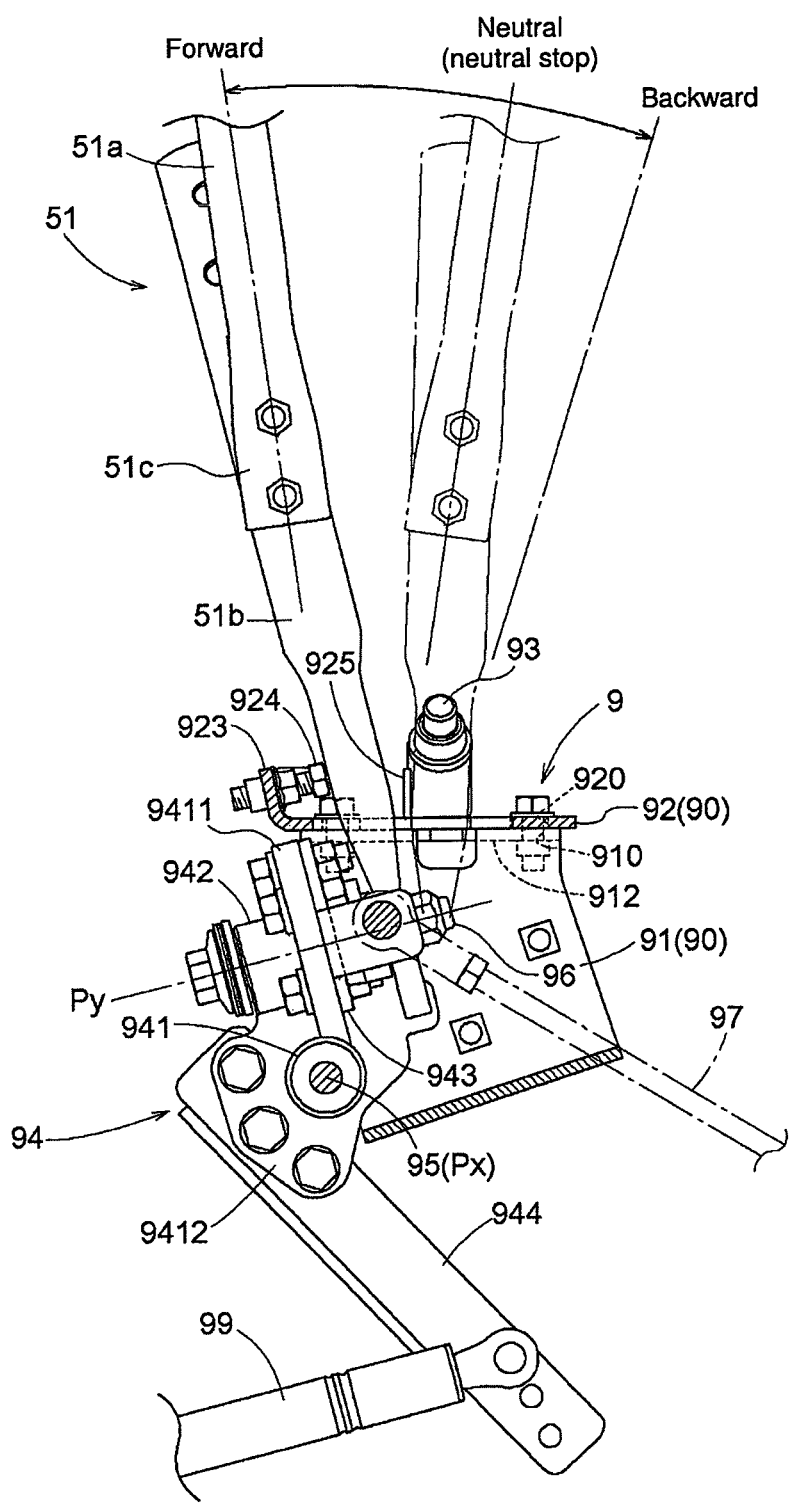
FIG. 8 is a side view illustrating the operation mechanism of the speed change lever.

Next, an operation mechanism of the speed change levers 51 is described with reference to FIGS. 7, 8, and 9. The speed change levers 51 each include an operating body 51a having a grip to be gripped by the driver which extends horizontally in the transverse direction of the vehicle body, and a lever base 51b which is linked to the operating body 51a via a coupler 51c. The lever base 51b is interlocked and connected to a swash plate operation shaft of the built-in HST of the left rear-axle transmission portion 4a and the right rear-axle transmission portion 4b via a guide unit 9 fixated to the vehicle frame 2.

The guide unit 9 is provided with a housing 90 configured by a U-shaped base 91 and a guide plate 92, the guide plate 92 being mounted on a first mounting surface 911 and a second mounting surface 912 formed on left and right top portions of the base 91. A hole is formed on the guide plate 92 and the lever base 51b of the speed change levers 51 penetrates the hole. The hole also acts as a guide hole for the speed change levers 51, and is configured by a speed change guide hole 921, which guides the movement of the speed change levers 51 in a speed change operation direction; and a neutral guide hole 922, which guides the movement of the speed change levers 51 in a neutral holding direction. The speed change operation is carried out by the speed change levers 51 pivoting about a speed change pivot axis center Px. A neutral holding operation is carried out by the speed change levers 51 pivoting about a neutral pivot axis center Py orthogonal to the speed change axis center Px. The length of the speed change guide hole 921 corresponds to the operation range of the speed change levers 51, ranging from the maximum forward speed to the maximum backward speed. The neutral guide hole 922 extends from a position of the speed change guide hole 921 corresponding to the neutral position of the speed change levers 51 in a direction orthogonal to the position of the speed change guide hole 921, and holds the speed change levers 51 in the neutral position.

An intermediate member 94 is arranged inside the housing 90 and transmits operational displacement of the speed change levers 51 to the swash plate operation shaft of the HST via a rod 97. The intermediate member 94 includes a first boss 941, a second boss 942, a first arm 943, and a second arm 944 which are connected to one another. The first boss 941 includes a boss hole having the speed change pivot axis center Px as its axis center, and a speed change pivot shaft 95 which is attached to the housing 90 is inserted into the boss hole. A flange extending outward in a radial direction is provided to a peripheral surface of the first boss 941, and a first coupler 9411 and a second coupler 9412 are formed on the flange. The second boss 942 and the first arm 943 are coupled to the first coupler 9411, the second boss 942 including a boss hole having the neutral pivot axis center Py as its axis center. A neutral pivot shaft 96 is pivotably inserted in the boss hole of the second boss 942, and the lever base 51b is coupled to the neutral pivot shaft 96. The rod 97 is coupled to the free end of the first arm 943. The second arm 944 is coupled to the second coupler 9412, and a damper 99 is coupled to the free end of the second arm 944.

Figure 9:
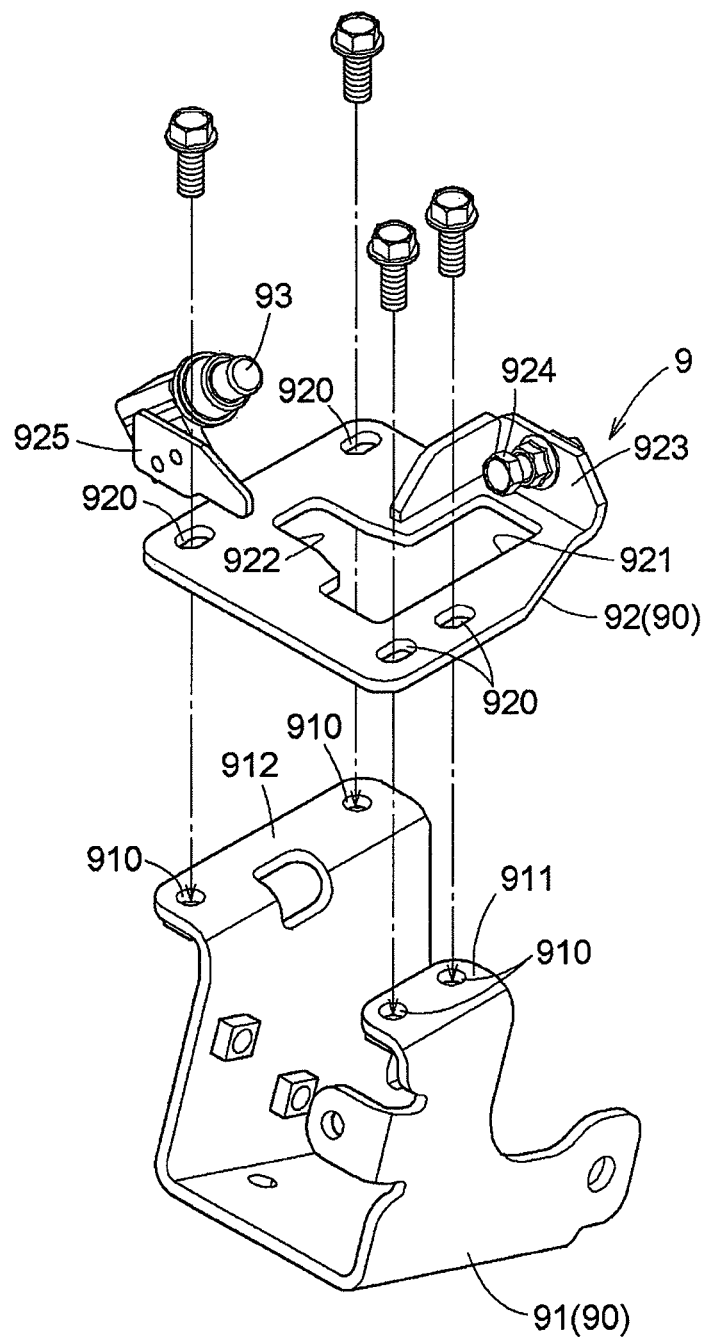
FIG. 9 is an exploded view of a housing of the operation mechanism.

As illustrated in FIG. 9, attaching round holes 910 are provided to the first mounting surface 911 and the second mounting surface 912 of the base 91, and attaching oblong holes 920 are provided to the guide plate 92 in positions corresponding to the attaching round holes 910. As a result, a position of the guide plate 92 relative to the base 91 in a speed change direction can be adjusted.

An attaching part 923 extending vertically is formed near the maximum speed side of the speed change guide hole 921 of the guide plate 92. A screw rod 924 is arranged on the attaching part 923 as a maximum forward speed limiter. By adjusting the amount that the screw rod 924 is drawn out from the attaching part 923, the upper limit position in a forward speed increasing direction (maximum speed position) of the speed change levers 51 can be adjusted.

An attaching bracket 925 stands near a terminal end side of the neutral guide hole 922 of the guide plate 92. A limit switch 93 is attached to the attaching bracket 925, and detects that the speed change lever 51 is in the neutral holding position when the lever base 51b of the speed change levers 51 enters into and along the neutral guide hole 922 and makes contact with the limit switch 93. The attaching bracket 925 with the limit switch 93 attached thereto is fixated to the guide plate 92. Thus, even when the position of the guide plate 92 is adjusted using the attaching oblong holes 920 in order to align the neutral guide holes 922 and the neutral position of the speed change levers 51, the position of the limit switch 93 relative to the neutral guide hole 922 remains unchanged, thereby ensuring that the lever base 51b and the detecting part of the limit switch 93 do not become misaligned. This stabilizes detection of the lever base 51b by the limit switch 93. It is noted that the attaching oblong holes 920 may be provided on a base 91 side.

Other Embodiments (1) In the specific embodiment described above, a midmower in which the mower unit 6 is installed between the front wheels 11 (11a and 11b) and the rear wheels 12 (12a and 12b) functions as one type of mower; however, the present invention can also be applied to other types such as a front mower in which the mower unit 6 is installed forward of the front wheels 11.

(2) In the specific embodiment described above, the screen 810 of the display unit 81 was configured by the liquid crystal panel 814; however, other flat panels may also be used, or the screen 810 may be configured by a two-dimensionally arranged lamp group or the like.

(3) In the present invention, a line linking the left front corner area LFC and the seat back top center portion SBC is used as a substitute for the line of vision of a seated driver directed at the left front corner area LFC; however, other substitutable lines may be used. An important aspect of the present invention is that the screen 810 of the display unit 81 is within the field of view of the driver sitting in the driver's seat 53 when he/she is carefully watching the left front corner area LFC.

The present invention can be applied to a mower having a mower unit mounted to a vehicle frame which is supported by front wheels and rear wheels.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A mower comprising:
    a vehicle frame supported on front wheels and rear wheels;
    a mower unit mounted to the vehicle frame;
    a driver's seat arranged on the vehicle frame;
    a left panel positioned on a left side of the driver's seat; and
    a display unit arranged in an area of the left panel, wherein the display unit includes a screen,
    wherein both a left front corner area of the mower unit and the display unit are visible to a driver seated on the driver seat along a sight line extending from the driver to the left front corner area, and
    wherein the screen of the display unit faces a top center portion of a seat back of the driver seat.

2. The mower according to claim 1, wherein the sight line links the left front corner area of the mower unit and a top center portion of a seat back of the driver's seat and passes through the display unit.

3. The mower according to claim 1, wherein the driver's seat is arranged behind the mower unit.

4. The mower according to claim 1, wherein the left panel is arranged in an area of a left fender having a fender top surface inclining downward in a forward direction.

5. A mower comprising:
    a vehicle frame supported on front wheels and rear wheels;
    a mower unit mounted to the vehicle frame;
    a driver's seat arranged on the vehicle frame;
    a left panel positioned on a left side of the driver's seat; and
    a display unit arranged in an area of the left panel,
    wherein both a left front corner area of the mower unit and the display unit are visible to a driver seated on the driver seat along a sight line extending from the driver to the left front corner area, wherein the left panel comprises:
    an attachment base that projects upward; and
    an inclined attachment surface for mounting the display unit.

6. The mower according to claim 1, further comprising a left fender having a curved top surface extending in a front-back direction of the vehicle.

7. The mower according to claim 6, wherein the curved top surface comprises:
    a first top surface positioned forward of the display unit;
    a second top surface positioned rearward of the display unit; and
    a curvature of the first top surface being greater than a curvature of the second top surface.

8. The mower according to claim 1, further comprising at least one opening located in an area near a center of the vehicle, wherein said at least one opening is:
    located forward of the display unit; and
    sized and configured to allow a left hand-operated speed change lever to pass upwardly therethrough.

9. The mower according to claim 8, wherein an upper portion of the left hand-operated speed change lever curves or projects toward a center of the vehicle.

10. The mower according to claim 1, wherein the display unit comprises a group of notification devices arranged on at least one side of a display screen of the display unit.

11. A mower comprising:
a vehicle frame supported on front wheels and rear wheels;
a mower unit mounted to the vehicle frame;
a driver's seat arranged on the vehicle frame;
a left panel positioned on a left side of the driver's seat; and
a display unit arranged in an area of the left panel, wherein the display unit includes a screen,
wherein a sight line links a left front corner area of the mower unit and a top center portion of a seat back of the driver's seat and passes through the display unit, and
wherein the screen of the display unit faces a top center portion of a seat back of the driver seat.

12. The mower according to claim 11, wherein the driver's seat is arranged behind the mower unit.

13. A mower comprising:
a vehicle frame supported on front wheels and rear wheels;
a mower unit mounted to the vehicle frame;
a driver's seat arranged on the vehicle frame and being located behind the mower unit and in front of an engine or transmission;
a first panel positioned on one side of the driver's seat; and
a display unit arranged in an area of the first panel, facing up and toward the driver seat, and located forward of a seat back of the driver seat, wherein the display unit includes a screen,
wherein an imaginary line links a first front corner area of the mower unit and a top center portion of a seat back of the driver's seat and passes through the display unit, whereby a seated driver can see, during mowing, both the display unit and the first front corner area, and
wherein the screen of the display unit faces a top center portion of a seat back of the driver seat.

14. The mower according to claim 13, wherein the display unit is located below a driver sight line extending to the first front corner area so as to not obstruct viewing of the first front corner area.

15. The mower according to claim 13, further comprising a hand-operated speed change lever located forward of the display unit.

* * * * *